United States Patent
Baechle et al.

(10) Patent No.: US 7,461,906 B2
(45) Date of Patent: Dec. 9, 2008

(54) METHOD FOR CHANGING THE PRESSURE MEDIUM IN AN ELECTROHYDRAULIC BRAKING SYSTEM

(75) Inventors: Martin Baechle, Glashütten 1 (DE); Axel Wagner, Schlüchtern (DE); Michael Hitzel, Rödermark (DE)

(73) Assignee: Continental Teves Ag & Co. oHG, Frankfurt (DE)

( * ) Notice: Subject to any disclaimer, the term of this patent is extended or adjusted under 35 U.S.C. 154(b) by 213 days.

(21) Appl. No.: 10/524,460

(22) PCT Filed: Aug. 13, 2003

(86) PCT No.: PCT/EP03/08986

§ 371 (c)(1),
(2), (4) Date: Oct. 18, 2005

(87) PCT Pub. No.: WO2004/016489

PCT Pub. Date: Feb. 26, 2004

(65) Prior Publication Data

US 2006/0152072 A1    Jul. 13, 2006

(30) Foreign Application Priority Data

Aug. 14, 2002  (DE)  ............... 102 37 183
Mar. 5, 2003   (DE)  ............... 103 09 479
Apr. 11, 2003  (DE)  ............... 103 16 648

(51) Int. Cl.
*B60T 13/18* (2006.01)

(52) U.S. Cl. ..................................... 303/11
(58) Field of Classification Search ............... 303/11
See application file for complete search history.

(56) References Cited

U.S. PATENT DOCUMENTS

| | | | | |
|---|---|---|---|---|
| 4,418,803 A | * | 12/1983 | Chichester | ............... 188/352 |
| 4,902,077 A | * | 2/1990 | Belart et al. | ............. 303/113.1 |
| 4,946,230 A | * | 8/1990 | Sakamoto et al. | ......... 303/113.1 |
| 5,330,259 A | * | 7/1994 | Ravndal et al. | .......... 303/115.4 |
| 5,605,384 A | * | 2/1997 | Johnston et al. | .......... 303/113.1 |
| 5,704,766 A | * | 1/1998 | Fennel et al. | ................. 417/42 |
| 6,193,031 B1 | * | 2/2001 | Baechle et al. | .............. 188/352 |

FOREIGN PATENT DOCUMENTS

| | | |
|---|---|---|
| DE | 39 35 353 A1 | 4/1991 |
| DE | 42 32 130 A1 | 3/1994 |
| DE | 195 28 859 A1 | 2/1997 |
| DE | 197 00 410 A1 | 7/1998 |
| DE | 101 47 180 A1 | 6/2002 |
| WO | WO 02/42135 A1 | 5/2002 |

* cited by examiner

*Primary Examiner*—Robert A. Siconolfi
*Assistant Examiner*—James K Hsiao
(74) *Attorney, Agent, or Firm*—RatnerPrestia

(57) ABSTRACT

The invention solves the problem of supplying fresh fluid, in particular in electrohydraulic brake systems, to all areas of the conduit systems that are not reached in a conventional brake fluid change.

Therefore, the invention provides that a change of the pressure fluid be assisted by a hydraulic pump, during which change among others pressure fluid is delivered by means of the pump out of the pressure fluid reservoir through the inlet valves and out of the system through opened wheel bleeder connections.

6 Claims, 6 Drawing Sheets

Entl. = bleeder connection
EV inlet valve
AV outlet valve
TV cut-off valve

METHOD FOR CHANGING THE PRESSURE MEDIUM IN AN ELECTROHYDRAULIC BRAKING SYSTEM

TECHNICAL FIELD

The present invention generally relates to a method for changing the pressure fluid and more particularly relates to a method for changing the pressure fluid of an electrohydraulic brake system.

BACKGROUND OF THE INVENTION

In a hydraulic brake system of the afore-described type wherein parts of the conduit system are closed by valves, a conventional change of pressure fluid will not be adequate to supply all areas of the brake system with fresh pressure fluid and maintain them free of air and gas bubbles, because a change of this type will only reach the brake conduit between the master brake cylinder and the given wheel brake for a supply with fresh pressure fluid. Especially in cases with a high content of water or dirt in the brake fluid, it must be ensured that the pressure fluid volume existing outside of the hydraulic fallback level is replaced by fresh pressure fluid. This measure will considerably enhance the safety of operation of an electrohydraulic brake system.

The published filling instruction ATE 520 24.46 discloses a brake fluid change or change of the pressure fluid. This filling instruction serves as a basis for directions for a brake fluid change, as carried out in workshops. This change is a so-called conventional change of the pressure fluid by way of manually applying the brake pedal several times, with the result that fresh pressure fluid is only substituted for the pressure fluid in the brake conduits between the master brake cylinder and the respective wheel brake.

BRIEF SUMMARY OF THE INVENTION

Hence, the underlying problem of the invention involves providing a method for an electrohydraulic brake system that permits performing a pressure fluid change where all areas of the brake system are supplied with fresh pressure fluid.

To solve the afore-described problem, it is provided, in the practice of the invention, to carry out the following process steps:
1. conventional change of the pressure fluid by repeated manual application of the brake pedal.
2. activating on the pump and delivering pressure fluid out of the reservoir.
3. connecting the inlet and outlet valves and the cut-off valve such that pressure fluid is fed from the high-pressure accumulator either to the wheel bleeder connections or into the pressure fluid reservoir.

As major parts of the conduit system correspond to a conventional brake system (i.e. the brake conduits leading from the master brake cylinder through cut-off valves to the wheel brakes), the change of the pressure fluid for this part of the conduit system can be in a conventional way, i.e. fresh pressure fluid is replenished by way of the pressure fluid reservoir and pumped by way of the repeated manual application of the brake pedal from the master brake cylinder through the brake conduits to the wheel brakes where it is discharged at corresponding wheel bleeder connections.

To feed fresh pressure fluid to the other areas of the brake system, the pump will be activated and the valves of the system so actuated as to cause the pump to deliver fresh pressure fluid to those areas. As this occurs, it is also possible for the pump to be actuated in a clocked manner to generate pressure pulsations eliminating air bubbles, if any, in the conduit system. The same effect is achieved when the outlet valves are actuated in a clocked manner.

To ensure a complete change of the pressure fluid, said change is executed in the following order:
1. delivering the pressure fluid by means of manual application of the brake pedal in the direction of the wheel bleeder connections;
2. pressure fluid delivery by the pump also in the direction of the wheel bleeder connections;
3. loading and unloading the accumulator in such a fashion that the pressure fluid is delivered in the direction of the wheel bleeder connections;
4. loading and unloading the accumulator in such a fashion that the pressure fluid is delivered in the direction of the pressure fluid reservoir;
5. pressure fluid delivery by the pump in the direction of the wheel bleeder connections.

The latter process step also allows checking whether the brake conduits have been properly connected after a repair that possibly took place beforehand. To that effect, pressure fluid is delivered with the wheel bleeder connection open, while those of the other wheel brakes are closed. By opening the respective inlet valves, a corresponding pressure build-up in the wheel brakes can be found out. The gradual formation of all four wheel brakes into triplets permits detecting which conduits might have been interchanged, because a pressure build-up in each of the partial steps is allowed to be detected only in those wheel brakes the inlet valves of which are opened. Should there be any discrepancies, e.g. the inlet valves would no longer be correctly associated with the wheel brakes.

DETAILED DESCRIPTION OF THE PREFERRED EMBODIMENTS

Figure 1:
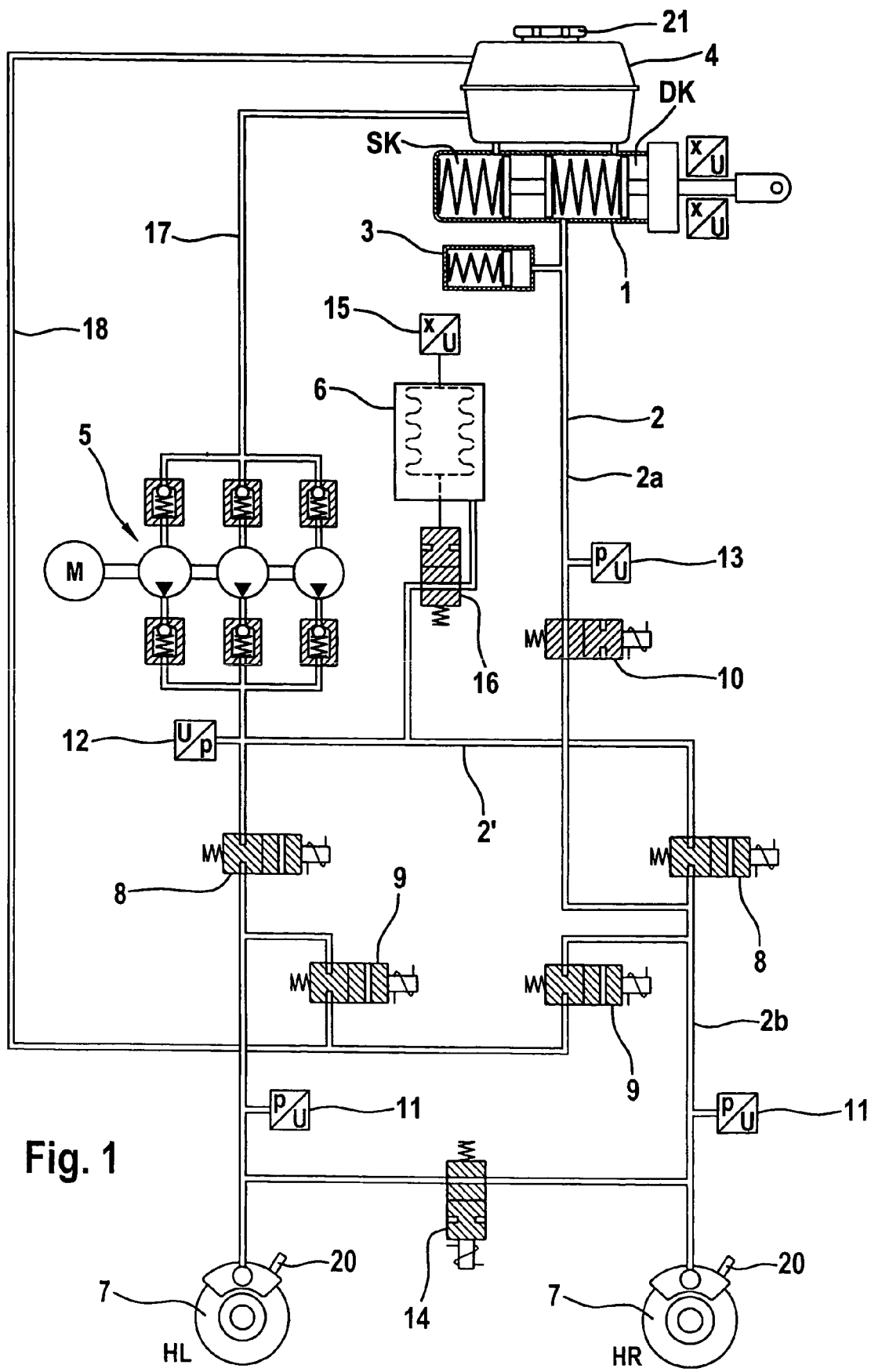
FIG. 1 shows the hydraulic circuit diagram of a hydraulic brake system.

First, reference is made to FIG. 1 showing a typical electrohydraulic brake system of the following design:

A master brake cylinder 1 of tandem configuration comprises two brake circuits, i.e. a primary circuit (also referred to as push-rod circuit DK), and a secondary circuit SK, with the illustrated primary brake circuit 2 being in communication with a pedal-operated simulator 3. Moreover, a pressure fluid reservoir 4 is connected to the master brake cylinder 1. Motor-driven pumps 5 and a high-pressure accumulator, e.g. a metal boot accumulator 6, form a pressure supply system to which pressure fluid (brake fluid) is supplied from the pressure fluid reservoir 4. To that effect, pump 5, by way of an intake conduit 17, is in communication with the pressure fluid reservoir 4. The wheel brakes 7 of the rear axle, by way of an inlet valve 8 each, are in communication with said pressure fluid supply system. Moreover, a connection to the pressure fluid reservoir 4 can be established by means of one outlet valve 9 each and a return conduit 18. The inlet and outlet valves 8, 9 are normally closed. Pressure build-up in the wheel brakes 7 is by opening the given inlet valve 8, while pressure decrease is by opening the given outlet valve 9. In this way, a controlled brake circuit 2' is formed, with the pressure delivered to the wheel brakes 7 being determined by the master brake cylinder pressure which, in a controlled braking operation, is hydraulically separated from the wheel brakes 7. To that effect, a cut-off valve 10 is provided in conduit 2a terminating downstream of the inlet valve 8 in conduits 2b leading to the wheel brakes 7, with the said cut-off valve, in the control mode, being closed, remaining open only in case of a failure of the controlled brake circuit 2', i.e. due to a failure of the pressure fluid supply.

The system, among others, is monitored and controlled by various pressure sensors. Associated with the individual wheel brakes 7 are brake pressure sensors 11; a pump pressure sensor 12 is associated with the pressure fluid supply system, while a simulation pressure sensor 13 is associated with the master brake cylinder per brake circuit. In an electrohydraulic braking operation, the cut-off valve is closed. The pressure in the master brake cylinder serves as a control quantity. To that effect, the pressure of the master brake cylinder 1 is measured by the simulation pressure sensor 13 and passed as a control quantity to the control system of the controlled brake circuit 2'. In case of a failure of the pressure supply system, the cut-off vale 10 remains opened. The wheel brakes 7, hence, are directly connected, in a conventional way, by means of conduits 2a and 2b to the master brake cylinder 1. A compensating valve 14 will ensure a pressure balance between the wheel brakes of an axle.

The brake system must be regularly serviced, in particular, the brake fluid must be changed. Errors are not unlikely to occur, with e.g. connections transposed or the brake system not properly bled resulting in air bubbles. To feed all areas of the brake system with fresh pressure fluid for checking the brake system after any possible repairs, the following process is suggested:

The wheel brakes 7 are, as only schematically shown, provided with wheel bleeder connections 20 being valve-controlled, as the case may be, by means of which pressure fluid can be discharged from the brake circuits.

In order to collect the old, used pressure fluid during the pressure fluid change, preferably, bleeder bottles are connected to the said wheel bleeder connections 20 collecting the pressure fluid discharged from the brake circuits. Of course, other measures are also feasible, preventing the contact of the used pressure fluid with the environment.

Moreover, the filling nozzle 21 of the pressure fluid reservoir 4 is used for the manual replenishment of fresh pressure fluid during the entire process.

The individual sequences for carrying out the pressure fluid change in the hydraulic brake system are shown in the form of diagrams illustrated in FIGS. 2 to 6. Plotted on the horizontal axis is the time and on the vertical axis the connection states of the individual components of the brake system. The curves in the diagram are indicative of the connection state of the individual component. From top to bottom, the following components are considered:

Pump:

With the following connection states: 0: off; 1: pumping.
  Inlet Valves EV:

With the following connection states: 0: closed; 1: opened.
  Outlet Valves AV:

With the following connection states: 0: closed; 1: opened.
  With respect to the inlet and outlet valves EV and AV the abbreviations VL, VR, HL, HR mean: front to the left; front to the right; rear to the left; and rear to the right.
  Cut-Off Valve TV:

In respect of the push-rod circuit DK and the secondary circuit SK, with the following connection states: 0: opened; 1: closed.
  Wheel Bleeder Connections ENTL:

With the following connection states: 0: closed; 1: opened.
  Manual Pedal Application PEDAL ACTUAT:

With the conditions: 0: brake pedal not applied; 1: brake pedal applied.

If all valves and the pump are in the 0 state, the brake system will be in the basic state.

Figure 2:
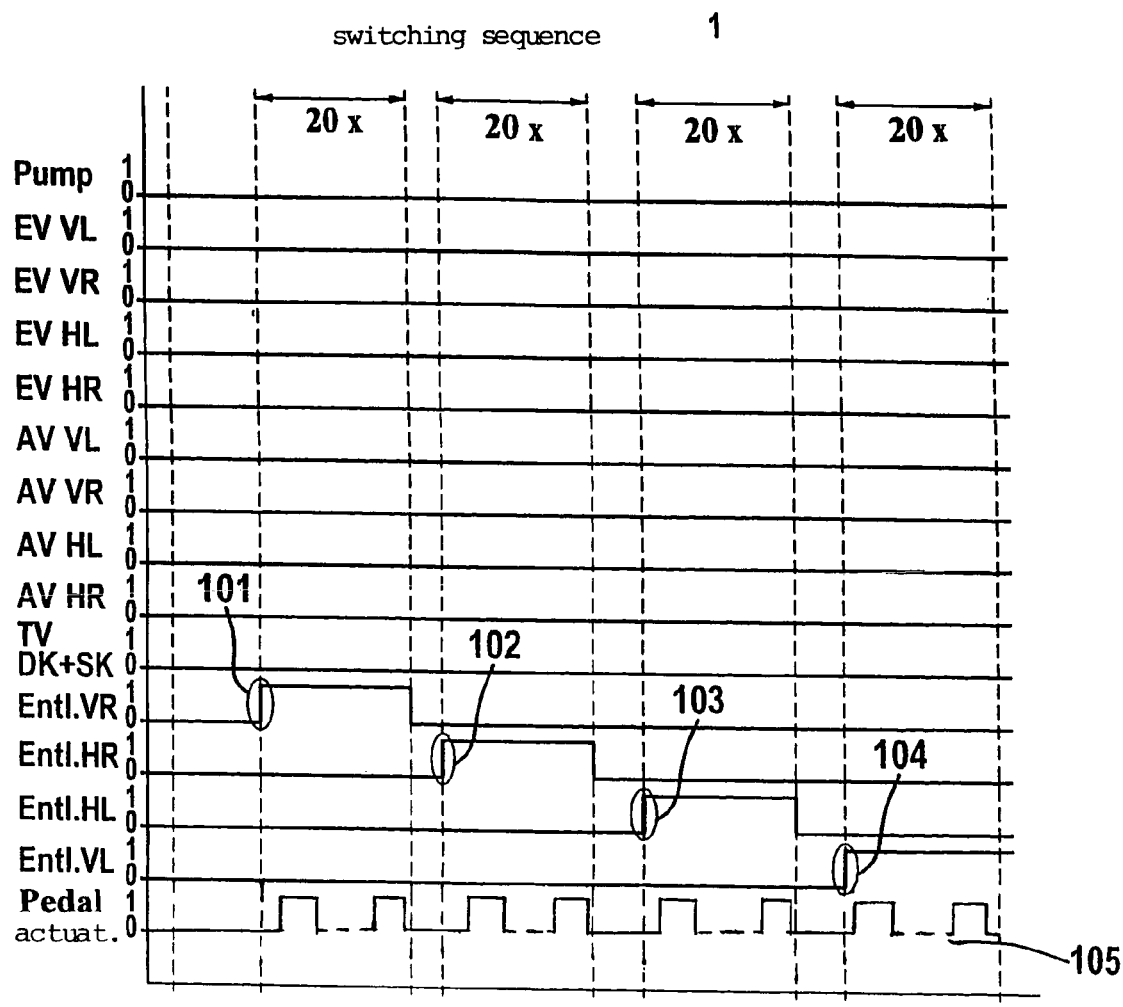
FIG. 2 shows a diagram for illustrating a first sequence of the method of the invention.

The first connection sequence as shown in FIG. 2 easily conveys that the wheel bleeder connections VR, HR, VL and VR are successively opened (markings 101, 102, 103, 104), with the brake pedal being manually applied twenty times during a state of opening (marking 105). As this occurs, pressure fluid propagates through the conventional brake circuit comprising master brake cylinder 1, cut-off valve 2, brake conduits 2a, 2b and wheel brakes 7, because fresh pressure fluid is replenished manually during the entire process by way of the filling nozzle 21 of the pressure fluid reservoir 4, as has been mentioned hereinabove. The controlled brake circuit 2' will not be affected thereby as both the inlet valves 8 and the outlet valves 9 remain closed. This operation corresponds to a conventional change of pressure fluid, i.e. the change of pressure fluid of a conventional non-controlled brake system.

Figure 3:
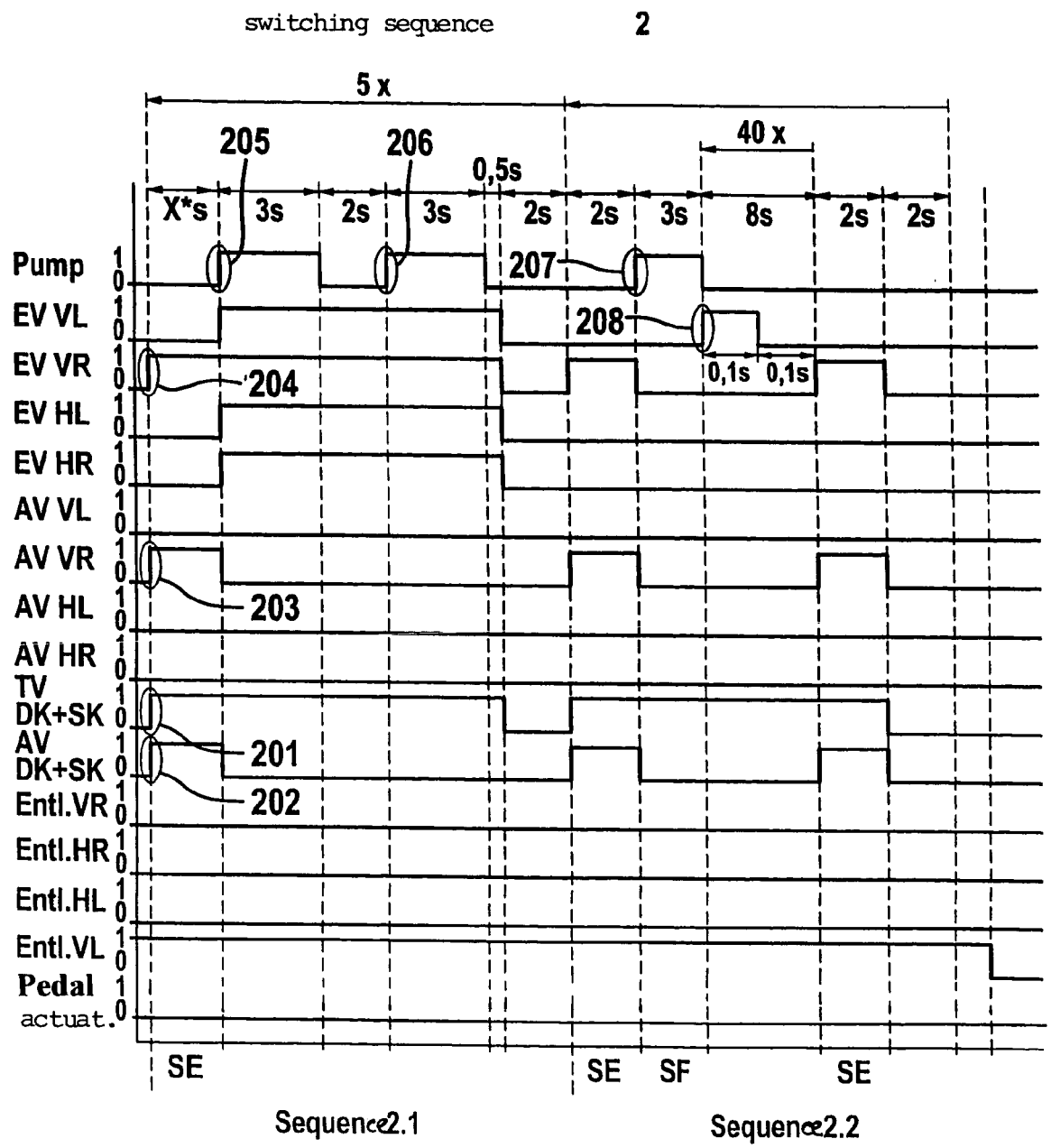
FIG. 3 shows a diagram for illustrating a second sequence of the method of the invention.
Figure 4:
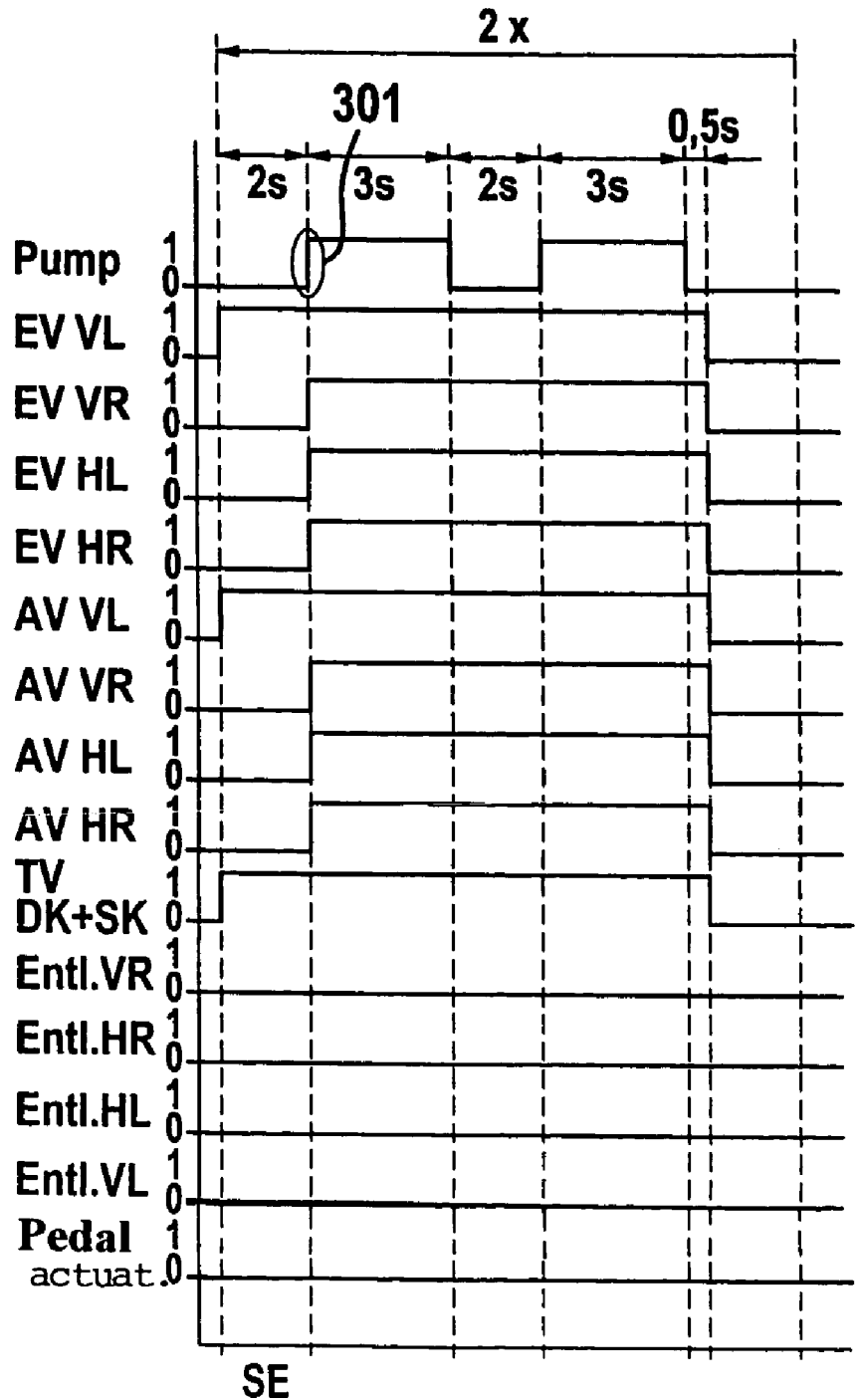
FIG. 4 shows a diagram for illustrating a third sequence of the method of the invention.

In the following diagrams of FIG. 3 the connection state of the compensating valve AV 14 is additionally shown in the push-rod circuit and in the secondary circuit. The states are 0: opened and 1: closed.

The second circuit sequence starts with an accumulator evacuation SE in which the cut-off valves 10 (marking 201) and the compensating valves 14 (marking 202) are closed. Moreover, the inlet valve 8 and the outlet valve 9 for a wheel brake, e.g. the one at the front to the right, is opened (marking 203, 204) resulting in an evacuation of the accumulator 6 by means of the return conduit 18.

Thereafter, all inlet valves 8, in a partial sequence 2.1, are opened, all outlet valves and the cut-off valves 10 of the two brake circuits are closed, it being possible for the compensating valves 14 to remain opened. Moreover, the wheel bleeder connection at the front to the left remains open and the wheel bleeder connection 20 on which is provided the bleeder bottle, respectively, remains open so that pumps 5 deliver from the pressure fluid reservoir 4 to the said wheel bleeder connection 20 (marking 205, 206). As this occurs, especially the intake conduit 17 is flushed with fresh pressure fluid and thereby bled. If need be, circuit breaks are to be provided for pumps 5. For terminating the said partial sequence 2.1, the inlet valves 8 are closed again; in this respect, it should be noted that pumps 5 cease to operate a short time before, in order to prevent pressure peaks from occurring. The partial sequence 2.1 can be repeated up to 5 times.

The following partial sequence 2.2 initially provides again for an accumulator evacuation SE and a subsequent defined accumulator filling SF, wherein the inlet valves 8 are closed while pump 5 delivers (marking 207). Then the inlet valve at the front to the left, in short repeats of less than 0.1 seconds, is opened and closed 40 times (marking 208) so that the accumulator 6 is evacuated in a pulsed manner, enabling the pressure fluid to flow off by means of bleeder connection 20 at the front to the left. The result is that fresh fluid is supplied to the accumulator, and, further, bubbles adhering due to the pulse-type load of the system, in particular, in the valve block, are removed.

In the step then following, the accumulator, again, is evacuated and the system restored to the basic state.

In the following connection sequence 3 (FIG. 4), all inlet valves 8 and all outlet valves 9 are opened. The wheel bleeder connections 20 are closed so that, with the pump 5 activated (marking 301), pressure fluid is delivered from reservoir 4, by means of inlet and outlet valves 8,9 and by means of return conduit 18, back to the pressure fluid reservoir 4. This step, in particular, serves for delivering fresh pressure fluid to the return conduit 18, and for bleeding it. Air enclosed therein will be passed to the pressure fluid reservoir where it will separate from the pressure fluid to collect in the gas phase above the level of filling.

Figure 5:
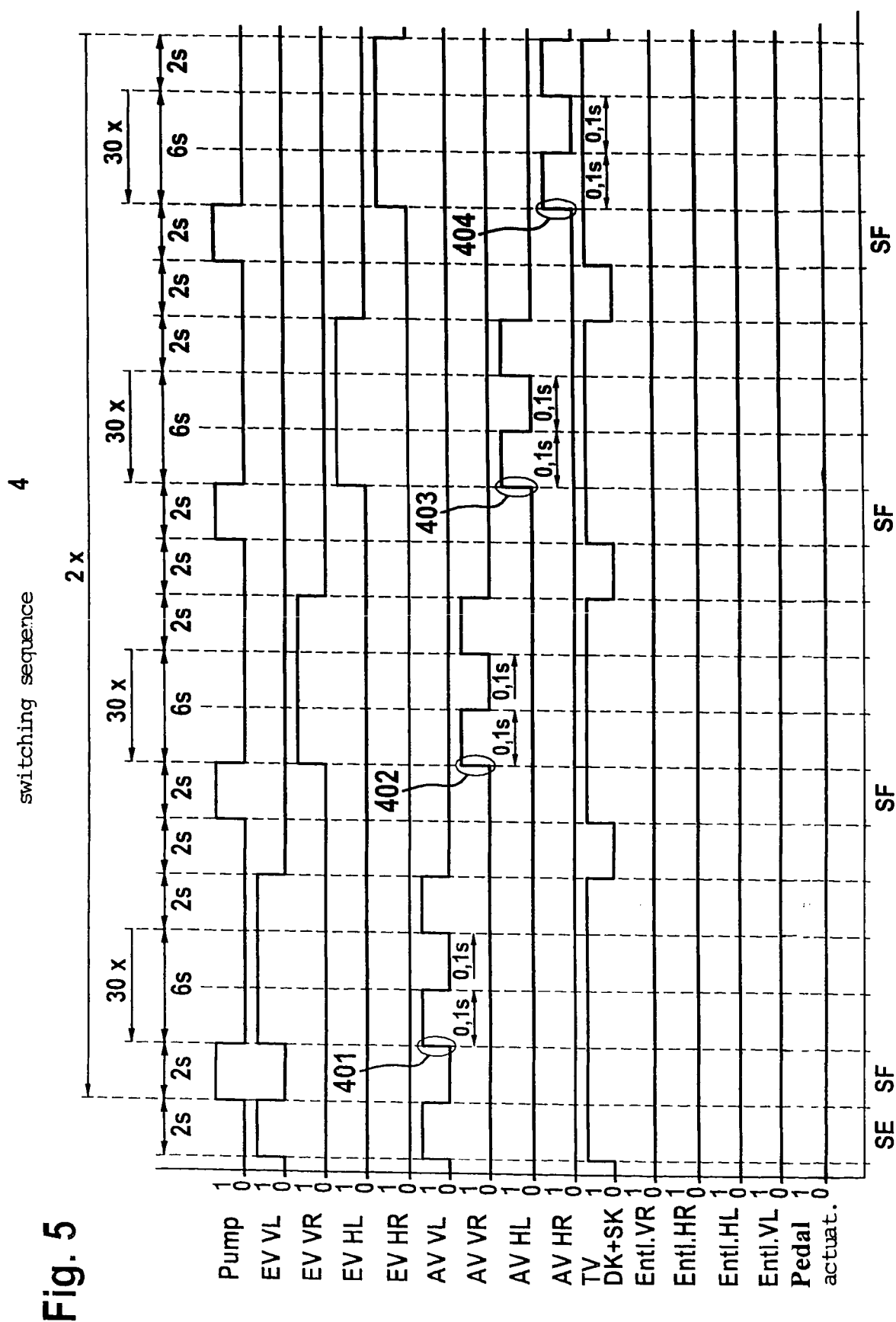
FIG. 5 shows a diagram for illustrating a fourth sequence of the method of the invention.

Also, the return conduit 18 is flushed in process step 4 (FIG. 5). However, as this occurs, the outlet valves 9 (markings 401 through 404) are successively switched in a clocked manner so that, again, pressure pulsations are produced and the return conduit 18 is intermittently flushed to thereby eliminate air bubbles. Connection sequence 4 can be performed two times.

Figure 6:
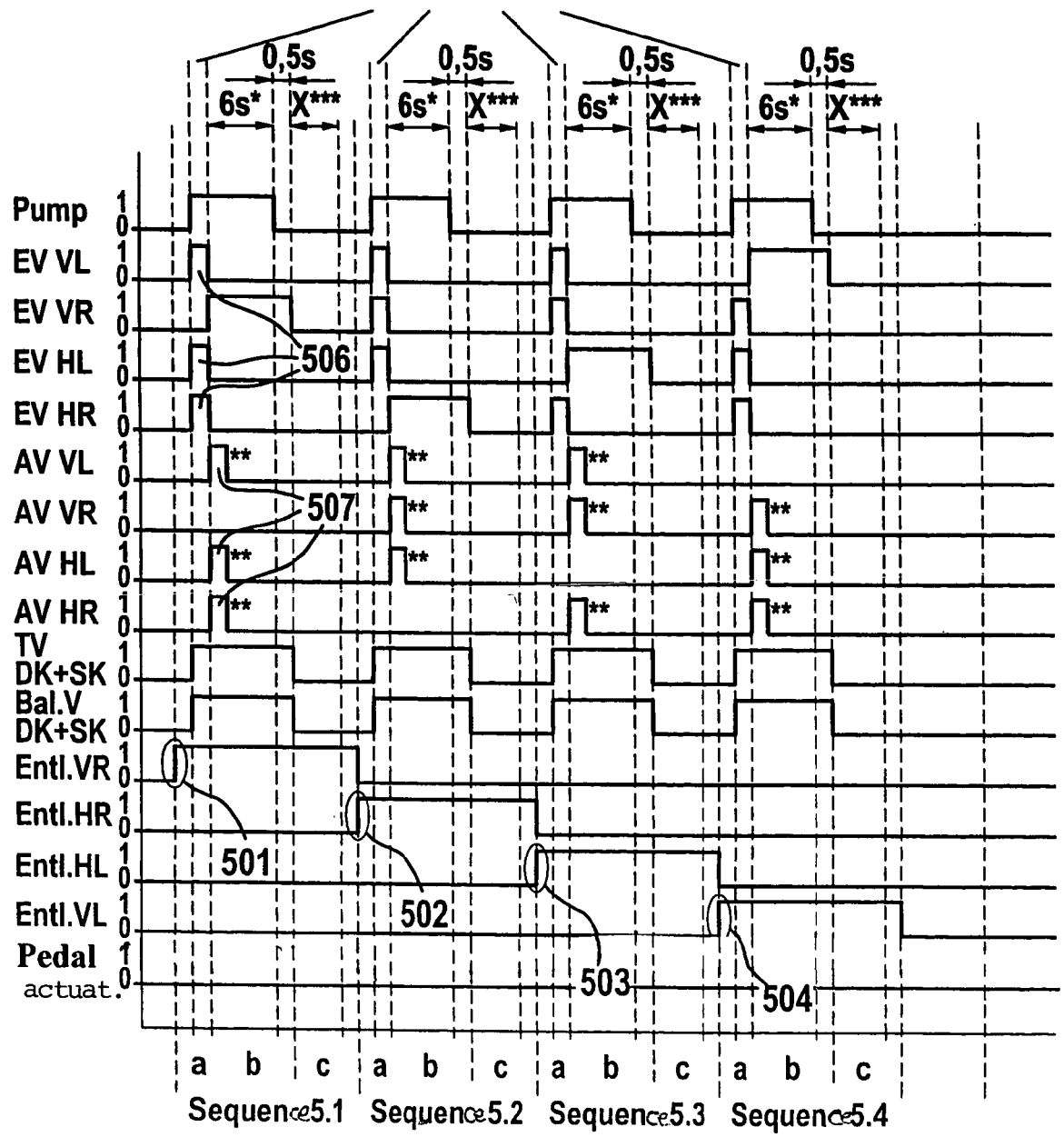
FIG. 6 shows a diagram for illustrating a fifth sequence of the method of the invention.

In a final fifth sequence as shown in FIG. 6, the wheel bleeder connections 20 are successively opened (markings 501 through 504) in partial sequences 5.1, 5.2, 5.3 and 5.4. The other three inlet valves (triples) (marking 506) are opened before the inlet valve 8 of the wheel brake with the opened wheel bleeder connection 20 (marking 505) is opened so that pressure builds up in the associated wheel brakes which shortly thereafter is reduced again to 2 bar approximately by opening associated outlet valves 9 (marking 507). The pressure in the wheel brakes can be monitored as this occurs. The said pressure must be in conformity with the given connection states. As pressure successively builds up and decreases in wheel brakes respectively forming triples, it will be possible to determine whether or not conduits have been transposed. Subsequently, the pump delivers a large quantity of pressure fluid through the opened wheel bleeder connection 20 in order to remove the remaining air and the used brake fluid from the hydraulic system. The end of a partial sequence is the repeated manual application of the brake pedal (marking 508), supplying fresh pressure fluid from the pressure fluid reservoir 4 to the opened wheel bleeder connection 20. The number of applications is dictated by the operator and will be determined by the quality of the pressure fluid supplied from the system, that means fresh and air-free pressure fluid.

The invention claimed is:

1. A method for changing the pressure fluid of an electro-hydraulic brake system, comprising a pedal-operated master brake cylinder and a brake circuit controlled by the master brake cylinder pressure, including a pump, the intake side of which, by means of an intake conduit, is in communication with a pressure fluid reservoir, and a high-pressure accumulator as well as inlet and outlet valves for the wheel brakes connected to the brake circuit, with an inlet valve controlling the connection of the related wheel brake to the high-pressure accumulator, and an outlet valve controlling the connection of the related wheel brake to the pressure fluid reservoir by means of a non-pressurized return conduit, and with the master brake cylinder being connected to the brake circuit by means of a cut-off valve inserted downstream of the inlet valves, comprising at least the following steps:
    1. conventional change of the pressure fluid by repeated manual application of the brake pedal;
    2. activating the pump and delivering pressure fluid out of the reservoir;
    3. connecting the inlet and outlet valves and the cut-off valve in a first configuration such that pressure fluid is fed from the high-pressure accumulator to wheel bleeder connections and;
    4. connecting the inlet and outlet valves and the cut-off valve in a second configuration such that pressure fluid is fed from the high-pressure accumulator into the pressure fluid reservoir.

2. Method as claimed in claim 1, wherein fresh pressure fluid is supplied to the pressure fluid reservoir while the process steps are performed.

3. Method as claimed in claim 1, wherein the pump is clock-actuated when pressure fluid is supplied into the pressure fluid reservoir.

4. Method as claimed in claim 1, wherein the outlet valves are clock-actuated when pressure fluid is supplied into the pressure fluid reservoir.

5. Method as claimed in claim 1, wherein the change of the pressure fluid is executed by means of the pump in the following sequence:
    delivering the pressure fluid by means of manual application of the brake pedal in the direction of the wheel bleeder connections;
    pressure fluid delivery by the pump also in the direction of the wheel bleeder connections;
    loading and unloading the accumulator in such a fashion that the pressure fluid is delivered in the direction of the wheel bleeder connections;
    loading and unloading the accumulator in such a fashion that the pressure fluid is delivered in the direction of the pressure fluid reservoir;
    pressure fluid delivery by the pump in the direction of the wheel bleeder connections.

6. Method as claimed in claim 1, wherein during a delivery of pressure fluid by way of the wheel bleeder connection of one wheel, pressure is applied to the other three wheel brakes by opening the associated inlet valves, with the wheel brake pressures being measured and the determined pressure triplets being set into correlation to the operated inlet valves.

* * * * *